US00RE36899E

United States Patent [19]

Shetty et al.

[11] E Patent Number: Re. 36,899

[45] **Reissued Date of Patent: *Oct. 3, 2000**

[54] IRIDESCENT FILM WITH THERMOPLASTIC ELASTOMERIC COMPONENTS

[75] Inventors: Ramakrishna S. Shetty, Pelham; Scott A. Cooper, Yorktown Heights, both of N.Y.

[73] Assignee: Engelhard Corp., N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/335,985

[22] Filed: Nov. 8, 1994

Related U.S. Patent Documents

Reissue of:

[64] Patent No.: 5,089,318
Issued: Feb. 18, 1992
Appl. No.: 07/429,785
Filed: Oct. 31, 1989

[51] Int. Cl.[7] ..... B32B 7/02; B32B 27/08; B32B 27/36

[52] U.S. Cl. ..... 428/212; 428/213; 428/216; 428/392; 428/473.5; 428/480; 428/483; 350/163; 350/164; 350/166

[58] Field of Search ..... 428/212, 213, 428/216, 392, 473.5, 480, 483; 350/163, 164, 166

[56] References Cited

U.S. PATENT DOCUMENTS

| | | | |
|---|---|---|---|
| Re. 31,780 | 12/1984 | Cooper et al. | 428/212 |
| 3,711,176 | 1/1973 | Alfrey, Jr. et al. | 350/1.6 |
| 3,801,429 | 4/1974 | Shrenk et al. | 428/392 |
| 4,310,584 | 1/1982 | Cooper et al. | 428/212 |
| 4,937,134 | 6/1990 | Shrenk et al. | 428/213 |

OTHER PUBLICATIONS

Schrenk et al., Coextruded Elastomeric Opticl Interference Film, Antec '88, pp 1703–1707.

Miller, Technology Watch, Plastics World, Oct. 1988, p. 23.

Schrenk et al., Coextruded Elastomeric Optical Interference Film, presented to Society of Plastic Engineers Annual Technical Conference, Apr. 20, 1988.

*Primary Examiner*—Stevan A. Resan

*Attorney, Agent, or Firm*—Ostrolenk, Faber, Gerb & Soffen, LLP

[57] ABSTRACT

Improvements in multilayer light reflecting film are effected by the use of a thermoplastic elastomer resin in a system in which two or more resinous materials form a plurality of the layers.

16 Claims, No Drawings

IRIDESCENT FILM WITH THERMOPLASTIC ELASTOMERIC COMPONENTS

Matter enclosed in heavy brackets [ ] appears in the original patent but forms no part of this reissue specification; matter printed in italics indicates the additions made by reissue.

BACKGROUND OF THE INVENTION

The present invention relates to multilayer coextruded light-reflecting films which have a narrow reflection band due to light interference. When the reflection band occurs within the range of visible wavelength, the film is iridescent. Similarly, when the reflection band falls outside the range of visible wavelength, the film is either ultraviolet or infrared reflecting. Such multilayer films and methods by which they can be produced are known in the art.

The multilayer films are composed of a plurality of generally parallel layers of transparent thermoplastic resinous material in which the contiguous adjacent layers are of diverse resinous material whose index of refraction differs by at least about 0.03. The film contains at least 10 layers and more usually at least 35 layers and, preferably, at least about 70 layers.

The individual layers of the film are very thin, usually in the range of about 30 to 500 nm, preferably about 50–400 nm, which causes constructive interference in light waves reflected from the many interfaces. Depending on the layer thickness and the refractive index of the polymers, one dominant wavelength band is reflected and the remaining light is transmitted through the film. The reflected wavelength is proportional to the sum of the optical thickness of a pair of layers.

The quantity of the reflected light (reflectance) and the color intensity depend on the difference between the two refractive indices, on the ratio of optical thicknesses of the layers, on the number of layers and on the uniformity of the thickness. If the refractive indices are the same, there is no reflection at all from the interfaces between the layers. In multilayer iridescent films, the refractive indices of contiguous adjacent layers differ by at least 0.03 and preferably by at least 0.06 or more. For first order reflections, reflectance is highest when the optical thicknesses of the layers are equal, although suitably high reflectances can be achieved when the ratio of the two optical thicknesses falls between 5:95 and 95:5. Distinct color reflections are obtained with as few as 10 layers. However, for maximum color intensity it is desired to have been 35 and 1000 or even more layers. High color intensity is associated with a reflection band which is relatively narrow and which has high reflectance at its peak. It should be recognized that although the term "color intensity" has been used here for convenience, the same considerations apply to the invisible reflection in the ultraviolet and infrared ranges.

The multilayer films can be made by a chill-roll casting technique using a conventional single manifold flat film die in combination with a feedblock which collects the melts from each of two or more extruders and arranges them into the desired layer pattern. Feedblocks are described for instance in U.S. Pat. Nos. 3,565,985 and 3,773,882. The feedblocks can be used to form alternating layers of either two components (i.e. ABAB . . . ); three components (e.g. ABCABCA . . . or ACBCACBC . . . ); or more. The very narrow multilayer stream flows through a single manifold flat film die where the layers are simultaneously spread to the width of the die and thinned to the final die exit thickness. The number of layers and their thickness distribution can be changed in inserting a different feedblock module. Usually, the outermost layer or layers on each side of the sheet are thicker than the other layers. This thicker skin may consist of one of the components which makes up the optical core; may be a different polymer which is utilized to impart desirable mechanical, heat sealing, or other properties; or may be a combination of these.

Examination of iridescent films of desirable optical properties revealed deficiencies in certain mechanical properties. For example, the adhesion between individual layers of the multilayer structure may be insufficient, and the film may suffer from internal delamination or separation of layers during use. The iridescent film is often adhered to paper or board for its decorative effect, and is then used for greeting cards, cartons, wrapping paper and the like. Delamination of the film is unsightly and may even lead to separation of the glued joints of carton. In additional, the solvent resistance and heat stability of such films are not as great as desired for widespread utilization.

In U.S. Pat. No. 4,310,584, these deficiencies are significantly overcome by using a thermoplastic terephthalate polyester or copolyester resin as the high refractive index component of the system in which two or more resinous materials form a plurality of layers. While a substantial improvement was realized, it also required the use of two polymers from significantly different polymer families. That fact, in turn, means that there are inherent significant differences between the two polymers and their relative adhesion to each other, chemical resistance, toughness, etc. As a result, the film itself is generally no better than a particular characteristic than the weaker or poorer of the polymers employed. If two polymers closely related were employed in order to maximize relative adhesion to each other, or toughness, or chemical resistance, etc., the polymers involved did not have a sufficient difference in refractive index so as to create the desired iridescent color. It has now been found that further improvements in adhesion, solvent resistance and the like can be obtained by the use of an engineering thermoplastic resin.

Schrenk and Wheatley have reported the preparation of a multilayer light reflecting film co-extruded from two thermoplastic elastomers, Co-extruded Elastomeric Optical Interference Film, Antec '88, 1703–1707. The film, which had one thermoplastic elastomer based on nylon and the other based on a urethane, exhibited reversible changes in reflection spectra when deformed and relaxed. That is, this very specific combination had the ability of stretching without losing appearance characteristics.

Accordingly, it is the object of this invention to provide new and improved multilayer light-reflecting films which exhibit increased resistance to delamination, improved solvent resistance and/or improved heat stability. This and other objects of the invention will become apparent to those skilled in this art from the following detailed description.

SUMMARY OF THE INVENTION

This invention relates to an improved multilayer light-reflecting film and more particularly to a transparent thermoplastic resinous film of at least 10 generally parallel layers in which the contiguous adjacent layers are of diverse transparent thermoplastic resinous material differing in refractive index by at least about 0.03 and at least one of the resinous materials being an engineering thermoplastic elastomer resin.

DESCRIPTION OF THE INVENTION

It has now been found that the objectives of this invention are realized by employing an thermoplastic elastomer (TPE) as one of the resinous materials. Such materials are copolymers of an thermoplastic hard segment such as polybutyl terephthalate, polyethylene terephthalate, polycarbonate, etc., and a soft elastomeric segment such as polyether glycols, silicone rubbers, polyetherimide and the like. Changing the percentage of the soft elastomer segment will result in thermoplastic elastomers having different refractive indexes. It is thus possible to have a thermoplastic elastomer copolymer which differs in refractive index from the base hard segmented thermoplastic polymer by greater than 0.03. It is also possible to obtain two TPE's with the same hard and soft segments but with a difference in refractive index of greater than 0.03 where the only difference between the two TPE's is the amount of the soft elastomeric segments in the copolymer.

The thermoplastic elastomers are preferably segmented thermoplastic copolyesters containing recurring long chain ester units derived from dicarboxylic acids and long chain glycols and short chain ester units derived from dicarboxylic acids and low molecular weight diols.

The long chain glycols are polymeric glycols having terminal (or as nearly terminal as possible) hydroxide groups and a molecular weight above about 400 and preferably from about 400 to 4,000. They can be poly(alkylene oxide) glycols such as, for example, poly(ethylene oxide) glycol, poly(propyl oxide) glycol, poly(tetramethalene oxide) glycol and the like.

The short chain ester unit refers to low molecular weight compounds or polymer chain units having molecular weights of less than about 550. They are made using a low molecular weight diol (below about 250) such as ethylene diol, propylene diol, butanediol, etc., or equivalent ester forming derivatives such as ethylene oxide or ethylene carbonate for ethylene glycol, with a dicarboxylic acid to form ester units.

The dicarboxylic acids are aliphatic, cycloaliphatic or aromatic dicarboxylic acids of low molecular weight, i.e., having a molecular weight of less than about 300. Examples include terephthalic acid, isophthalic acid, naphthalene dicarboxylic acid, cyclohexane dicarboxylic acid, adipic acid, succinic acid, oxalic acid and the like.

The segmented thermoplastic copolyester elastomers are well known in the art and are described, for example, in U.S. Pat. Nos. 3,651,014, 3,763,109, 3,766,146 and 3,784,520, the disclosures of which are incorporated herein by reference.

A preferred TPE is based on a short chain ester groups derived from 1,4-butanediol and terephthalic acid and long chain ester groups derived from poly(tetramethylene oxide) glycol and terephthalic acid.

The iridescent film of the present invention can be obtained by coextruding the TPE with a different transparent thermoplastic resin which is selected to differ in refractive index by at least about 0.03 and preferably at least 0.06. Among the other resinous materials which can be used are transparent thermoplastic polyester or copolyester resins characterized by a refractive index of about 1.55 to about 1.61. Examples of usable thermoplastic polyester resins include poly(ethylene terephthalate) (PET) which is made by reacting either terephthalic acid or dimethyl terephthalate with ethylene glycol; polybutylene terephthalate (PBT) which is made by the catalyzed condensation of 1,4-butanediol with either terephthalic acid or dimethyl terephthalate; and the various thermoplastic copolyesters which are synthesized using more than one glycol and/or more than one dibasic acid. PETG copolyester, for example, is a glycol modified PET made from ethylene glycol and cyclohexanedimethanol (CHDM) and terephthalic acid; PCTA copolyester is an acid modified copolyester of CHDM which terephthalic and isophthalic acids. Other thermoplastic resins are described in the aforementioned U.S. Pat. No. 4,310,584, the disclosure of which is incorporated herein by reference.

The iridescent film of the present invention can also be obtained by coextruding the TPE with a different transparent TPE which is selected to differ in refractive index by at least about 0.03 and preferably at least 0.06.

In this instance, one segment of the resinous material in each TPE should be from the same polymer family, e.g. both hard segments should be a polyester such as a terephthalate etc. While it is preferred that both members of the family be the same, this is not essential and the hard segment of one TPE can for example be polybutylene terephthalate and the other polyethylene terephthalate.

A preferred combination in accordance with this invention involves the use of polybutylene terephthalate (PBT) as the thermoplastic polyester and a TPE which is a block copolymer of polybutylene terephthalate and polyether glycol as the low refractive index material. One such TPE resin is HYTREL 4059 FG. To prepare the film, the polyester was fed to the feedblock from on extruder, and the TPE was fed to the feedblock from the second extruder to form a 0.7 mil (17.5 um) thick film consisting of 115 optical layers and two polyester skin layers. Each skin layer was about 10% of the thickness of the total film. The polyester optical layers were each about 0.2 um in optical thickness, and each TPE optical layer was about 0.1 um. A 112 centimeter die was used to produce a 90-centimeter wide film of uniform overall thickness. The film was brightly iridescent and was prevailing green and red when seen by reflection at perpendicular incidence.

The iridescent films are tested for delamination in a conventional test by restraining one surface of the film by backing with adhesive coated tape, and applying another adhesive coated tape on the other surface. The adhesive coated tape from the top is pulled away and if no delamination is observed, then is reapplied and the process is repeated. The adhesive tapes previously used in U.S. Pat. No. 4,310,584 did not show any delamination with films which had a polyester or copolyester/PMMA core. However a new, more severe test using a new adhesive coated tape (3M-396) which has a much higher tack strength than the previously used tapes was chosen for delamination tests with the PBT/HYTREL films. This film withstood 20 pulls on the tape without any signs of delamination while the films produced in accordance with U.S. Pat. No. 4,310,584 could be delaminated. As examples, PBT/PMMA films could be delaminated in an average of 6 pulls, PET/polymethyl methacrylate (PMMA) films in an average of 9 pulls, PETG/PMMA films in an average of 8 pulls, ethylenevinyl acetate (EVA)/PETG films in an average of 4 pulls, EVA/polystyrene (PS) films in an average of 2 pulls and polypropylene (PP)/PS films in an average of 1 pull.

A more severe form of the delamination test is to immerse the films in various organic solvents and then test for delamination using the above described adhesive coated tape tests. To evaluate this PBT/HYTREL film for resistance to delamination, the film was immersed in various organic solvents, e.g. trichlorethylene, methyl ethyl ketone, toluene, tetrachlorethylene, etc. for a period of 24 hours. After 24 hours the film was removed from the organic solvent and dried, and then tested for delamination by restraining one surface of the film by backing with adhesive coated tape, and applying another adhesive coated tape on the other surface. The PBT/HYTREL films withstood 20 pulls on the tape without any sign of delamination. The non-TPE films generally became less resistant to delamination after immersion for 24 hours in most of the organic solvents. As examples, after immersion in hexane for 24 hours, PET/PMMA delaminated in 6 pulls, PBT/PMMA in 4 pulls, PETG/PMMA in 2 pulls and EVA/PETG, EBA/PS and PP/PS all in 1 pull. After immersion in tetrachloroethylene for 24 hours, PBT/PMMMA, PET/PMMA and PETG/PMMA films could be delaminated in 1 pull, whereas in EVA/PETG, EVA/PS and PP/PS films the layers separated by themselves or the samples disintegrated after immersion. In fact, the PBT/HYTREL films withstood the delamination tests even after immersion in the organic solvents for 28 days.

A number of other properties are also superior to those of previously known films. These include excellent toughness, tear resistance and solvent resistance. The latter is most important for film which is brought in contact with dry cleaning solvents, like trichloethylene, or with certain organic solvents in other converting operations.

To test the solvent resistance of the film, the film was immersed in each of a number of organic solvents. The solvent was permitted to air dry. The PBT/HYTREL iridescent films showed no signs of crazing or color loss with all of the organic solvents tested after 28 days of immersion. The previously known commercial films of PBT/PMMA, PET/PMMA, PETG/PMMA, PS/PP, PS/EVA, etc. evaluated by the same technique, suffered crazing or loss of color when immersed in most of these organic solvents. After immersion in hexane, EVA/PS and PP/PS showed color loss in less than 1 day. After immersion in tetrachloroethylene, PET/PMMA and PBT/PMMA films showed color loss in 7 days, and PETG/PMMA, EVA/PETG, EVA/PS and PP/PS films showed color loss in less than 1 day. After immersion in carbon tetrachloride, PET/PMMA, PBT/PMMA and PETG/PMMA films showed color loss in 1 day, and EVA/PETG, EVA/PS and PP/PS showed color loss in 5 minutes or less.

It was mentioned previously that the skin layer is thicker than the optical layers. Each skin layer should have a thickness of at least about 5% of the total thickness of the film, and may be as great as about 40% of the total film thickness. A variant of the film utilizes a third extruder to provide on each surface an outer skin of thermoplastic impact-modified acrylic resin. This skin layer may be the same as one of the optical core components or may be another thermoplastic material.

The two-component iridescent films, containing TPE, display excellent resistance to delamination, excellent solvent resistance and good iridescent color regardless of which component serves as the skin.

In order to further illustrate the present invention, various examples are set forth below and it will be appreciated that these examples are not intended to limit the invention. Unless otherwise stated, all temperatures are in degrees Centigrade and all parts and percentages are by weight throughout the specification and claims.

EXAMPLE 1

Polybutylene terephthalate thermoplastic polyester was fed to the feedblock from one extruder and a commercially available thermoplastic elastomer sold under the trade name HYTREL 4059 FG (duPont) from a second extruder to form a 115 layer optical core, and a second skin layer of PBT was added to each surface by means of a third extruder to form a 0.7 mil (17.5 um) thick iridescent film. The HYTREL resin is a segmented block copolymer of polybutylene terephthalate and polyether glycol. The resulting film was brightly iridescent and displayed excellent resistance to delamination as well as superior solvent resistance and temperature stability. Samples of the film withstood immersion in various solvents for a period of twenty-eight days and could not be delaminated. The films remained tough and tear resistant.

EXAMPLE 2

A multilayer structure similar to that of Example 1 was prepared, except that the TPE used was LOMOD (General Electric), which is a segmented block copolymer of PBT and polyether imide. A second skin layer of PBT was added to each surface by means of a third extruder. This film was similar in properties to that obtained in Example 1.

EXAMPLE 3

A multilayer structure similar to that of Example 1 was prepared, except that the thermoplastic polyester fed to the feedblock was PET. A second skin layer of PBT was added to each surface by means of a third extruder. This film was similar in properties to that obtained in Example 1.

EXAMPLE 4

A multilayer structure similar to that of Example 3 was prepared, except that the second skin layer added to each surface by means of a third extruder was PET. This film was similar in properties to that obtained in Example 1.

EXAMPLE 5

A multilayer structure similar to that of Example 3 was prepared, except that the second skin layer added to each surface by means of a third extruder was PETG copolyester. This film had similar delamination characteristics to the film obtained in Example 1, but also had excellent heat sealing characteristics.

EXAMPLE 6

A multilayer structure similar to that of Example 1 was prepared, except that the PBT in the optical core was replaced by another TPE—HYTREL 6556 FG (duPont)—which differed in refractive index from HYTREL 4059 FG by greater than 0.03. This film had similar delamination and solvent resistance characteristics to the film obtained in Example 1, but was even tougher and had better tear resistance. This film could also be stretched slowly by up to 15% and on release of the stress, would recover to its original dimensions.

Various changes and modifications can be made in the present invention without departing from the spirit and scope thereof. The above examples show films made with PBT or PET and TPEs, which are segmented block copolymers of PBT and a soft segment. Various polyesters, copolyesters, polycarbonates, and the like could be used instead of PBT or PET. The thermoplastic elastomers could be block copolymers of a hard segment, e.g. polyesters, copolyesters, polycarbonates and the like, and a soft segment, e.g. silicone glycols, polyether glycols, polyether imides and the like. Choosing the two components in the optical core which have similar chemistry in one segment or have superior adhesion qualities, and have a refractive index difference of at least 0.03, and preferably at least 0.06, will result in iridescent films which cannot be delaminated.

Components may be chosen to impart further improvements and specific properties like solvent resistance, temperature resistance, toughness, etc.

The choice of the outer skin layer will depend on the properties required in the film for either converting operations or end-use applications. The surface of the film may be required to be heat-sealable or receptive to adhesives, inks or coatings and the like. The outer skin material chosen should be chemically similar or have excellent adhesion to the usual skin layer comprising of one of the optical components, so that the total multilayer structure will not delaminate. In cases where resistance to solvents is a necessity for converting or end-use applications, the outer skin layer will also have to be solvent resistant.

Also, while the invention has been described with reference to cast, flat film type of film production, iridescent films can also be made by the tubular process (blown film). Accordingly, the various embodiments disclosed herein were for the purpose of illustration only and were not intended to limit the invention.

What is claimed is:

1. A transparent thermoplastic resinous laminate film of at least 10 very thin layers of substantially uniform thickness *in the range of about 30–500 nm*, said layers being generally parallel, the contiguous adjacent layers being of different transparent thermoplastic resinous materials of which one is a thermoplastic elastomer *and the other is not a thermoplastic elastomer*, the contiguous adjacent layers differing in refractive index by at least about 0.03*, the thermoplastic elastomer being a segmented thermoplastic copolyester elastomer of a thermoplastic hard segment and a soft elastomeric segment*.

2. The transparent thermoplastic laminate film of claim 1 wherein the outermost layers of the film are each at least 5% of the total thickness of the film.

3. The transparent thermoplastic resinous laminate film of claim 1 having at least 35 layers.

4. The transparent thermoplastic resinous laminate film of claim 3 having at least about 70 layers.

5. The transparent thermoplastic resinous laminate film of claim 4 wherein said adjacent resinous material has a refractive index which is lower by at least about 0.06.

6. The transparent thermoplastic resinous film of claim 1 wherein at least one layer is polybutylene terephthalate.

7. The transparent thermoplastic resinous laminate film of claim 6 wherein the thermoplastic elastomer is a segmented block copolymer of polybutylene terephthalate and [polyester] *polyether* glycol.

8. The transparent thermoplastic resinous laminate film of claim 6 wherein the thermoplastic elastomer is a segmented block copolymer of polybutylene terephthalate and polyether imide.

9. The transparent thermoplastic resinous laminate film of claim 6 having at least 70 substantially uniformly thick layers.

10. The transparent thermoplastic resinous laminate film of claim 1 wherein at least one layer is polyethylene terephthalate.

11. The transparent thermoplastic resinous laminate film of claim 10 wherein the thermoplastic elastomer is a segmented block copolymer of polyethylene terephthalate and polyether glycol.

12. The transparent thermoplastic resinous laminate film of claim 10 wherein the outermost layer resin is a glycol modified polyethylene terephthalate made from ethylene glycol and cyclohexanedimethanol.

13. The transparent thermoplastic resinous laminate film of claim 10 having at least 70 substantially uniformly thick layers.

14. A transparent thermoplastic resinous laminate film of at least 10 very thin layers of substantially uniform thickness *in the range of about 30–500 nm*, said layers being generally parallel, the contiguous adjacent layers being of different transparent thermoplastic resinous materials, the contiguous adjacent layers differing in refractive index by at least about 0.03 wherein each of the different transparent thermoplastic resinous materials is a segmented block copolymer of a terephthalate polymer and a [polyester] *polyether* glycol or polyether imide.

15. The transparent thermoplastic resinous laminate film of claim 14 wherein both thermoplastic elastomers are segmented block copolymers of polybutylene terephthalate and polyether glycol.

16. The transparent thermoplastic resinous laminate film of claim 14 having at least 70 substantially uniformly thick layers.

* * * * *